United States Patent
von Freyberg et al.

(10) Patent No.: US 10,494,010 B2
(45) Date of Patent: Dec. 3, 2019

(54) EXTENDABLE AND RETRACTABLE STEERING DEVICE FOR A VEHICLE

(71) Applicant: Bayerische Motoren Werke Aktiengesellschaft, Munich (DE)

(72) Inventors: Henri Freiherr von Freyberg, Munich (DE); Victor Kuehn, Munich (DE); Sebastian Kroes, Munich (DE); Nico Daun, Podsdam (DE); Marek Mitula, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/958,306

(22) Filed: Apr. 20, 2018

(65) Prior Publication Data

US 2018/0237051 A1    Aug. 23, 2018

Related U.S. Application Data

(63) Continuation of application No. PCT/EP2016/071777, filed on Sep. 15, 2016.

(30) Foreign Application Priority Data

Oct. 21, 2015  (DE) .......................... 10 2015 220 526

(51) Int. Cl.
*B62D 1/183* (2006.01)
*B60R 11/00* (2006.01)
*B62D 1/184* (2006.01)

(52) U.S. Cl.
CPC ........ *B62D 1/183* (2013.01); *B60R 2011/001* (2013.01); *B62D 1/184* (2013.01)

(58) Field of Classification Search
CPC ........ B62D 1/183; B62D 1/184; B62D 1/181; B62D 1/18; B60R 2011/001
(Continued)

(56) References Cited

U.S. PATENT DOCUMENTS 4,503,504 A * 3/1985 Suzumura ................. B60R 1/07
                                                       280/775
7,004,048 B2 * 2/2006 Kobayashi ............... B62D 1/04
                                                         74/552

(Continued)

FOREIGN PATENT DOCUMENTS

CN    101857046 A    10/2010
CN    103569185 A    2/2014
(Continued)

OTHER PUBLICATIONS

International Search Report (PCT/ISA/210) issued in PCT Application No. PCT/EP2016/071777 dated Dec. 14, 2016 with English translation (seven pages).

(Continued)

*Primary Examiner* — Keith J Frisby
(74) *Attorney, Agent, or Firm* — Crowell & Moring LLP

(57) ABSTRACT

A steering device of a two-track vehicle has a retaining element and a steering handle for the driver that is rotatably mounted therein, and has a guide device for the retaining element, along which the retaining element can be moved between an extended use position, toward the driver in the longitudinal direction of the vehicle, and a retracted rest position, further away from the driver. The guide device extends in the longitudinal and transverse directions of the vehicle.

15 Claims, 2 Drawing Sheets

(58) Field of Classification Search
USPC .............................. 280/775, 778; 74/493, 495
See application file for complete search history.

(56) References Cited

U.S. PATENT DOCUMENTS

| | | |
|---|---|---|
| 2003/0146040 A1 | 8/2003 | Dybalski et al. |
| 2004/0016588 A1 | 1/2004 | Vitale et al. |
| 2009/0065285 A1 | 3/2009 | Maeda et al. |
| 2013/0226411 A1* | 8/2013 | Hirano .................... B62D 6/00 701/42 |
| 2014/0260761 A1 | 9/2014 | Soderlind |
| 2014/0277896 A1 | 9/2014 | Lathrop et al. |
| 2016/0244070 A1 | 8/2016 | Bendewald et al. |

FOREIGN PATENT DOCUMENTS

| | | |
|---|---|---|
| DE | 697 08 735 T2 | 7/2002 |
| DE | 101 37 971 A1 | 2/2003 |
| DE | 103 47 925 A1 | 5/2005 |
| DE | 10 2006 006 995 A1 | 8/2007 |
| DE | 102006006995 A1 * | 8/2007 |
| DE | 20 2014 101 156 U1 | 3/2014 |
| DE | 10 2013 110 865 A1 | 4/2015 |
| EP | 0 802 105 A2 | 10/1997 |
| EP | 2 033 875 A2 | 3/2009 |
| FR | 1 490 973 A | 8/1967 |
| FR | 2 861 657 A1 | 5/2005 |
| WO | WO 03/020571 A1 | 3/2003 |

OTHER PUBLICATIONS

German-language Written Opinion (PCT/ISA/237) issued in PCT Application No. PCT/EP2016/071777 dated Dec. 14, 2016 (five pages).

German-language Search Report issued in counterpart German Application No. 10 2015 220 526.6 dated Aug. 12, 2016 with partial English translation (11 pages).

Chinese Office Action issued in Chinese counterpart application No. 201680059127.8 dated Sep. 9, 2019, with English translation (Fifteen (15) pages).

* cited by examiner

EXTENDABLE AND RETRACTABLE STEERING DEVICE FOR A VEHICLE

CROSS REFERENCE TO RELATED APPLICATIONS

This application is a continuation of PCT International Application No. PCT/EP2016/071777, filed Sep. 15, 2016, which claims priority under 35 U.S.C. § 119 from German Patent Application No. DE 10 2015 220 526.6, filed Oct. 21, 2015, the entire disclosures of which are herein expressly incorporated by reference.

BACKGROUND AND SUMMARY OF THE INVENTION

The invention relates to an extendable and retractable steering device of a two-track vehicle.

As the state of the art, in addition to DE 10 2006 006 995 A1, reference is made to WO 03/020571 A1.

In the (generally known) highly autonomous driving of a vehicle, a steering wheel (as the currently standard design of what is termed here a driver's steering handle) is not required. In this driving mode the steering wheel can be recessed into a so-called rest position in the vehicle's instrument panel, to free up space in the vehicle. The steering wheel, retracted in such a manner and therefore stored away relative to the usual extended usage position in which the driver steers the vehicle himself using the steering wheel, serves the additional function of a mode indicator for the autonomous driving mode.

The object of the present invention is to further develop a steering device such that the extension and retraction of the steering device is as comfortable as possible for the driver and, in particular, allows him as much free space as possible in the retracted rest position.

This and other objects are achieved by a steering device for a two-track vehicle, in particular a passenger car. The steering device can be moved between an extended (usage) position and a retracted (rest) position. In the extended position the steering device is used by the driver to steer the vehicle. In the retracted position, the steering device is recessed as far as possible into the instrument panel, in order to free up as much space as possible for the driver. In the retracted position the steering device cannot be used by the driver. If the steering device is located in the retracted position, the vehicle is either being controlled autonomously or is at a standstill. When at a standstill the retracted steering device offers the driver as much free space as possible when boarding and alighting from the vehicle.

The steering device according to the invention has a retaining element for the steering handle to be used by the driver in the usage position of the steering device. The retaining element is preferably concealed by an instrument panel of the vehicle both in the rest position and in the usage position, and is therefore not visible to the driver. The steering handle (for example in the form of a steering wheel or in the form of steering horns, also generally known) is arranged on the retaining element so that it can be rotated. This steering handle projects toward the driver, at least in the extended position. The driver can take hold of the steering handle, and thus steer the vehicle. In particular, a rod that is rotatably mounted in the retaining element is normally provided as a guide for the steering handle. The rod protrudes in the direction of the driver. At the end of the rod, the steering wheel or the steering horns is/are arranged. The steering device according to the invention is preferably intended for a (generally known) steer-by-wire (steering) system, so that no direct mechanical connection need be present between the steering handle and the steerable wheels of the vehicle.

The retaining element is displaceably mounted on a guide device, for example by way of rolling bearings or a friction bearing. The retaining element (and with it the steering handle), can be moved back and forth along this guide device between the retracted rest position of the steering device and its extended usage position.

If such a guide device extends only in the vehicle longitudinal direction, a relatively large amount of space must be reserved in the vehicle longitudinal direction to lower the steering handle as far as possible into the vehicle's instrument panel. It is therefore proposed according to the invention that the guide device extends both in the vehicle longitudinal direction and in the vehicle transverse direction. This means that when relocating into the retracted position, the steering handle moves at an angle to the vehicle longitudinal direction, and, for example, at least approximately in a horizontal plane. This allows a shift of the steering handle position which is comfortable for the driver, since it does not appear threatening, in particular when moving into the usage position, wherein this shift of position relative to the driver can take place quickly, i.e. in a very short time, which is very advantageous particularly in the event of termination of highly autonomous driving.

The steering device preferably comprises a drive for moving the retaining element along the guide device. In particular, the drive is an electric motor. The drive is preferably located on the retaining element. This means that a vehicle-fixed toothed rack can be provided. On the drive a pinion is then located, which engages with the toothed rack. The toothed rack preferably runs parallel to the guide device and can either be integrated into the guide device or arranged next to the guide device. As an alternative to a toothed rack, however, a belt drive can also be provided for relocating the steering handle with its retaining element.

Advantageously, the guide device has a curved shape. When retracting the steering device, the retaining element therefore follows a circular path, for example. As a result, the rod of the steering handle that is inserted in the retaining element is twisted relative to the vehicle longitudinal direction. This, in turn, leads to a very compact position of the steering handle with its retaining element in the retracted position. With the curved design of the guide device, other guides and drive elements, such as the above-mentioned toothed rack, are also preferably designed with a curved shape.

In any case, for a steer-by-wire steering system, a steering angle sensor and/or a steering torque sensor is provided on the retaining element. This sensor (or sensors) is used to detect a steering request applied by the driver to the steering handle. In addition, an actuator can be located on the retaining element, with which an actuating force can be exerted on the steering handle. Due to this actuating force the driver feels a corresponding resistance when steering, i.e. when specifying his steering request. The sensor(s) and actuator referred to can be integrated in a single assembly.

The motion of the steering device when relocating from the extended usage position into the retracted rest position (or vice versa) can be decomposed into a longitudinal component in the vehicle longitudinal direction and a transverse component in the vehicle transverse direction. Depending on the design of the guide device, a first length of the longitudinal component and a second length of the transverse component are obtained. For the most effective utilization of the available installation space, the following conditions are preferably proposed: the first length is preferably between 50% and 200%, in particular between 75% and 150%, of the second length. In particular, it is provided that the guide device is suitably curved within these specified values.

In the case of a steer-by-wire steering system, the vehicle can be steered with relatively small steering angles. Therefore, a steering wheel is not absolutely necessary here. Instead, it can be provided that the steering handle, as is generally known, comprises two steering horns positioned opposite one another (with respect to the rod that is rotatably mounted in the retaining element as referred to above). One steering horn is held by each of the driver's hands. Using the steering horns enables space to be saved, in particular in the direction of the vertical axis of the vehicle.

For a particularly space-saving arrangement of the steering device in the retracted position, it is preferably provided that the two steering horns are movable relative to one another. To achieve this, it is proposed that the steering handle comprises a linear steering horn guide. At least one of the steering horns is movable along this steering horn guide. It is thus possible to move the two steering horns toward each other when retracting the steering device. In a neutral position of the steering handle, the steering horn guide advantageously extends in the vehicle transverse direction.

A steering horn drive is preferably provided for moving at least one steering horn. In particular, the steering horn drive is an electric motor. Preferably, the steering horn drive is connected to one of the steering horns and is in engagement with a steering horn toothed rack via a pinion. Alternatively or in addition to the linear displacement of at least one steering horn, it is also possible that at least one of the steering horns can be folded down. This also enables a space-saving storage of the steering handle.

Extending from the vehicle or from an electrical energy distribution system of the vehicle and from a vehicle data bus, leads or cables are provided for the electrical energy transmission and information exchange with the steering device according to the invention and/or to the retaining element, in particular to sensors, actuator(s) and motor(s). These leads or cables are preferably held in a cable conduit. The cable conduit is preferably arranged such that it can pivot relative to the vehicle. When the retaining element for the steering handle is moved, the cable guide pivots along with it.

In terms of the arrangement of a steering device according to the invention with respect to a dashboard or instrument panel of the vehicle, the guide device and the retaining element are arranged behind the instrument panel, hence on the side of the instrument panel facing away from the driver. In the retracted position, the steering handle, possibly with the exception of the steering horns, is placed substantially within or behind the instrument panel. In the retracted position, a maximum of at least one of the steering horns protrudes some distance beyond the surface of the instrument panel in the direction of the driver. All other elements of the steering device are preferably recessed behind the instrument panel in the retracted position.

On the steering handle, for example in the center between the two steering horns, a control unit is preferably located. By pressing or touching this control unit, the retaining element with the steering handle moves into the retracted position. Preferably simultaneously with the touching or pressing, the control unit can change the vehicle into the autonomous driving mode. For example, the control unit can be integrated into an emblem of the vehicle manufacturer provided there.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
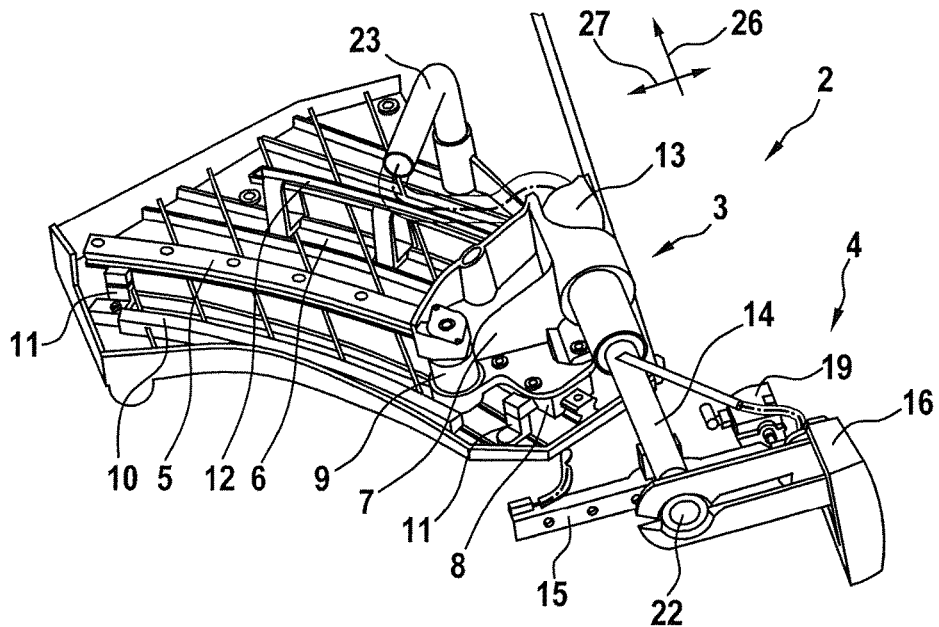
FIGS. 1 and 2 show different views of an exemplary embodiment of a steering device according to the invention.
Figure 2:
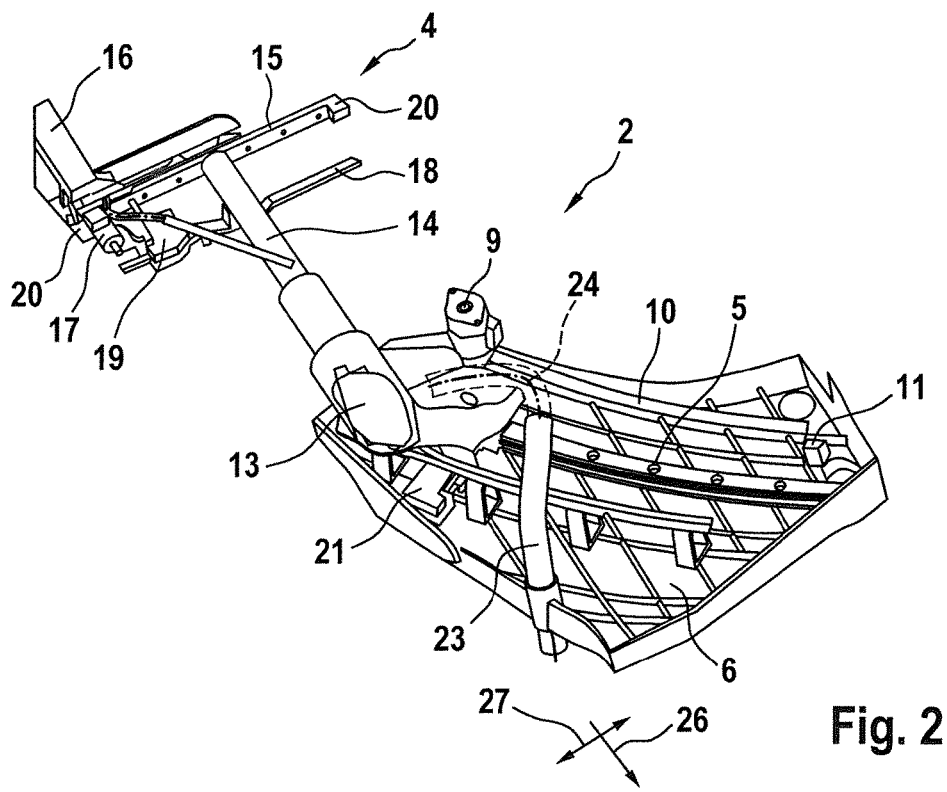
Figure 3:
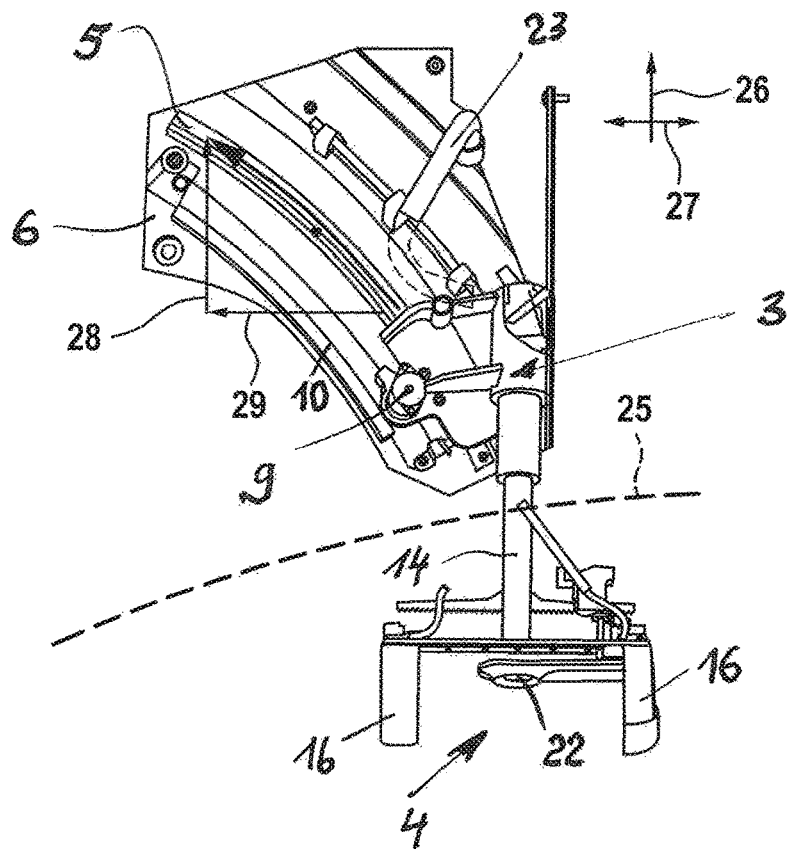
FIG. 3 shows the steering device in the extended usage position.
Figure 4:
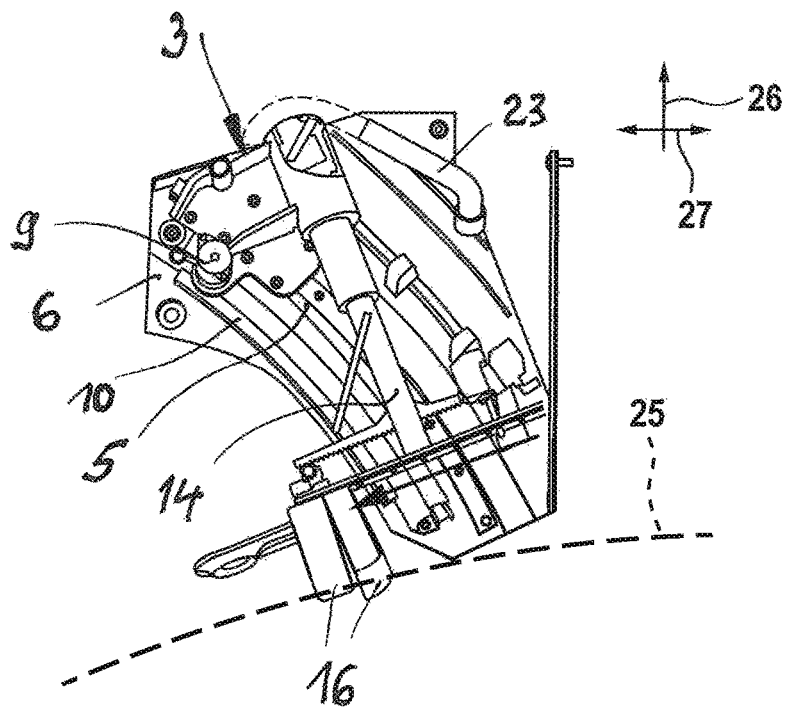
FIG. 4 shows the steering device in the retracted rest position.

FIGS. 1 and 2 show two different views of a retractable and extendable steering device 2 of a vehicle. The vehicle itself is not shown. However, a vehicle longitudinal direction 26 and a vehicle transverse direction 27 are drawn. In addition, FIGS. 3 and 4 show purely schematically in a plan view a border of an instrument panel 25 facing the driver. A base plate 6 of the steering device 2 accommodates the vehicle-fixed components. The base plate 6 can also be an integral component of other parts of the vehicle.

The steering device 2 includes a retaining element 3 and a steering handle 4 for the driver of the vehicle that is rotatably mounted in the retaining element 3 via a rod 14. In addition, a guide device 5 is provided. The guide device 5 is designed as a guide rail with a curved profile. The guide device 5 is mounted on the base plate 6.

The retaining element 3 has a retaining bracket 7. This retaining bracket 7 is movable on the guide device 5 via a carriage 8, i.e. arranged displaceably along or on the above-mentioned guide rail. To provide such a displacement, the steering device 2 includes a drive 9, implemented as an electric motor. The drive 9 is an integral part of the retaining element 3 and is mounted on the retaining bracket 7.

A toothed rack 10 mounted on the base plate 6 runs parallel to the guide device 5. The drive 9 has a pinion which is in engagement with the toothed rack 10. Via two end-stop sensors 11, the position of the retaining element 3 in the retracted and extended end position of the steering handle 4 can be detected. For the exact guidance of the retaining element 3, a further guide 12 is provided. The further guide 12 is designed, in particular, as a guide connecting member. The further guide 12 includes a groove. This groove is fixed with respect to the base plate 6. A pin, not shown, is arranged on the retaining element 3 and is guided in the groove. In the present case the guide device 5 is positioned between the further guide 12 and the toothed rack 10.

In the retaining bracket 7 the steering handle 4 is rotatably mounted. For this purpose, the steering handle 4 has a rod 14. The rod 14 is inserted in the retaining bracket 7. A steering angle sensor 13 is arranged in the retaining bracket 7. This steering angle sensor 13 detects the rotation of the rod 14. In addition, an actuator is located in the retaining bracket 7 to generate an actuating force on the rod 14.

On the side of the rod 14 facing the driver, the steering handle 4 includes two steering horns 16 (see in particular FIG. 3). These two steering horns 16 are held by the driver, instead of a conventional steering wheel. In the exemplary embodiment shown, the steering horn 16 facing the passenger (seated on the right-hand side of the driver) is linearly movable. The other steering horn 16 is not shown in FIGS. 1 and 2 for the sake of clarity. The steering handle 4 further has a linear steering horn guide 15. The linear steering horn guide 15 extends, in the neutral position of the steering handle 4, in the vehicle transverse direction 27. On this steering horn guide 15, the steering horn 16 (or the steering horns 16) can be linearly displaced. For this purpose, a steering horn drive 17 implemented as an electric motor is provided. The steering horn drive 17 is fixedly connected to the, in the present case only, movable steering horn 16 (and shown indicatively in FIGS. 1, 2). The steering horn drive 17 has a pinion. This pinion is in engagement with a steering horn toothed rack 18. The steering horn toothed rack 18 extends parallel to the steering horn guide 15. Two steering horn end stops 20 allow the detection of the position of the movable steering horn 16. Furthermore, the steering handle 4 includes a steering horn locking mechanism 19. This steering horn locking mechanism 19 fixes the movable steering horn 16 relative to the steering horn guide 15 or relative to the steering horn toothed rack 18. As a result, in the extended position of the steering device 2 it is ensured that the two steering horns 16 do not move relative to each other.

Leads or cables 24 for providing electrical energy and enabling signal transmission are routed from the vehicle to the retaining element 3 and from the retaining element 3 to the steering handle 4. The steering device 1 has a pivotable cable conduit 23 for the cables 24 routed to the retaining element 3. The pivotable cable conduit 23 is pivotably mounted relative to the base plate 6. When the steering device 2 is moved, the cable conduit 23 pivots along with it.

FIG. 3 shows the steering device 2 in the extended usage position. In this position the driver can grip the two steering horns 16 and thus steer the vehicle manually.

In the center between the two steering horns 16, the steering handle 4 has a control unit 22. This control unit 22 is integrated into the emblem of the vehicle manufacturer. By touching or pressing this control unit 22, the drive 9 and the steering horn drive 17 are activated, in which case the steering device 2 can move into the retracted position. This state is shown by FIG. 4.

In the retracted rest position according to FIG. 4 the steering device 2 is located almost completely behind the instrument panel 25. Only a part of the steering horns 16 protrudes beyond the instrument panel 25. Here it can be seen, among other things, that the right-hand steering horn 16 in FIG. 3 is displaced toward the left-hand steering horn 16. In addition it is apparent—since in FIGS. 3, 4, the steering device 2 is shown for a vehicle with a left-hand (in the vehicle) driver's seat substantially in plan view (in the direction of the road)—that the curvature of the guide device is directed substantially horizontally to the vehicle outer side closest to the driver, i.e. in the case of a vehicle with a left-hand driver's seat, it is curved to the left and to the front.

On the basis of FIGS. 3 and 4 it can be clearly seen that the guide device 5 extends in the form of an arc both in the longitudinal direction 26 and in the transverse direction 27 of the vehicle. The corresponding motion can be decomposed into a longitudinal component 28 and a transverse component 29. Due to the curved motion a pivoting of the rod 14 takes place relative to the vehicle's longitudinal direction 26. Through appropriate design of the lengths of the longitudinal component 28 and transverse component 29, the installation space within the instrument panel 25 can be used in an optimal way; furthermore, due to the curved path the extension of the steering handle 4 appears less threatening to the driver, in particular, than if the steering handle were moved directly toward a driver.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering device of a two-track vehicle, comprising:
   a retaining element;
   a steering handle that is rotatably mounted in the retaining element; and
   a guide device for the retaining element, along which the retaining element is movable between an extended usage position, toward a driver in a longitudinal direction of the vehicle, and a retracted rest position, further away from the driver, wherein
   the guide device extends in the longitudinal and transverse directions of the vehicle, and
   a movement of the steering device from the usage position into the rest position is composed of a longitudinal component oriented in the vehicle longitudinal direction with a first length and a transverse component oriented in the vehicle transverse direction with a second length.

2. The steering device as claimed in claim 1, further comprising:
   a drive on the retaining element, by which the retaining element is moved along the guide device.

3. The steering device as claimed in claim 2, wherein the guide device is curved in an approximately horizontal plane.

4. The steering device as claimed in claim 1, wherein the guide device is curved in an approximately horizontal plane.

5. The steering device as claimed in claim 1, wherein the first length is between 50% and 200% of the second length.

6. The steering device as claimed in claim 5, wherein the steering handle comprises two steering horns configured to be grasped by the driver with two hands, which steering horns are movable relative to each other.

7. The steering device as claimed in claim 6, wherein the steering handle has a linear steering horn guide, along which at least one of the steering horns is moved.

8. The steering device as claimed in claim 7, further comprising:
   a steering horn drive of the steering handle for moving at least one steering horn.

9. The steering device as claimed in claim 1, wherein the first length is between 75% and 150% of the second length.

10. The steering device as claimed in claim 1, further comprising:
    a steering angle sensor on the retaining element for detecting a steering movement applied to the steering handle.

11. The steering device as claimed in claim 1, wherein the steering handle comprises two steering horns configured to be grasped by the driver with two hands, which steering horns are movable relative to each other.

12. The steering device as claimed in claim 11, wherein the steering handle has a linear steering horn guide, along which at least one of the steering horns is moved.

13. The steering device as claimed in claim 12, further comprising:
  a steering horn drive of the steering handle for moving at least one steering horn.

14. The steering device as claimed in claim 11, further comprising:
  an instrument panel of the vehicle, wherein
  the guide device and the retaining element are arranged such that they are concealed by the instrument panel and, in the rest position, the steering handle with the exception of still visible steering horns, is located within the instrument panel.

15. The steering device as claimed in claim 1, further comprising:
  a cable conduit, through which at least one cable is routed from the vehicle to the retaining element, wherein
  the cable conduit is pivotably mounted on the vehicle in order to pivot when the steering device is moved.

\* \* \* \* \*